UNITED STATES PATENT OFFICE.

AUGUST PFEFFER, OF ULM, GERMANY.

PROCESS OF MAKING DIABETIC BREAD.

989,189.

Specification of Letters Patent. Patented Apr. 11, 1911.

No Drawing. Application filed October 28, 1909. Serial No. 525,208.

*To all whom it may concern:*

Be it known that I, AUGUST PFEFFER, a citizen of the German Empire, residing at Ulm a. D., in the Kingdom of Würtemberg, Empire of Germany, have invented certain new and useful Improvements in Processes of Making Diabetic Bread; and I do hereby declare the following to be a full, clear, and exact description of the invention, such as will enable others skilled in the art to which it appertains to make and use the same.

This invention has for its object an improved process for making bread of gluten flour, that is to say so-called diabetic bread. For making this bread hydrogen peroxid is employed as aerating or rising agent.

The bread hitherto made from gluten flour with yeast has the disadvantage that such bread possesses an extremely unpleasant flavor of gluten which renders its consumption difficult and makes the bread disliked, in spite of its excellent properties from a health point of view. Now in order to avoid this disadvantage, by the present invention hydrogen peroxid is employed in such a way that the gluten flavor is entirely removed. A further advantage in the use of hydrogen peroxid consists in insuring that the bread be thoroughly aerated, which as is well known is of great importance in diabetic bread, while other chemical products such as baking powder, ammonia and the like produce almost no aeration or rising of the gluten bread. Finally, gluten bread to which hydrogen peroxid is added has a strikingly white color.

The improved process is carried out in the following way:—In making the gluten dough hydrogen peroxid is added thereto. When the dough is finished the formation of the same into separate loaves is immediately commenced and these latter when finished may be immediately placed in the oven, as according to the improved process the rising or aeration only takes place in the oven by a great generation of gas, in contrast to ordinary kinds of bread in which hydrogen peroxid can only operate to effect a rising of the dough, but not of the loaves in the oven.

I declare that what I claim is:—

The process of making diabetic bread from gluten flour, consisting in adding hydrogen peroxid to the dough, forming the dough into loaves, and then baking the loaves, whereby the baking process insures rising and relatively great aeration of the loaves and the elimination of the gluten flavor therefrom.

In testimony whereof I affix my signature, in presence of two witnesses.

AUGUST PFEFFER.

Witnesses:
  JEAN GULDEN,
  HERM. HOPPE.